3,531,246
MOLECULAR SIEVE SORBENT AND PROCESS FOR THE MANUFACTURE OF AMMONIA
John M. Matsen, Roselle, N.J., assignor to Esso Research and Engineering Company, a corporation of Delaware
Filed Apr. 8, 1964, Ser. No. 358,331
Int. Cl. B01d *53/02;* B01j *11/78;* C01c *1/04*
U.S. Cl. 23—199      7 Claims

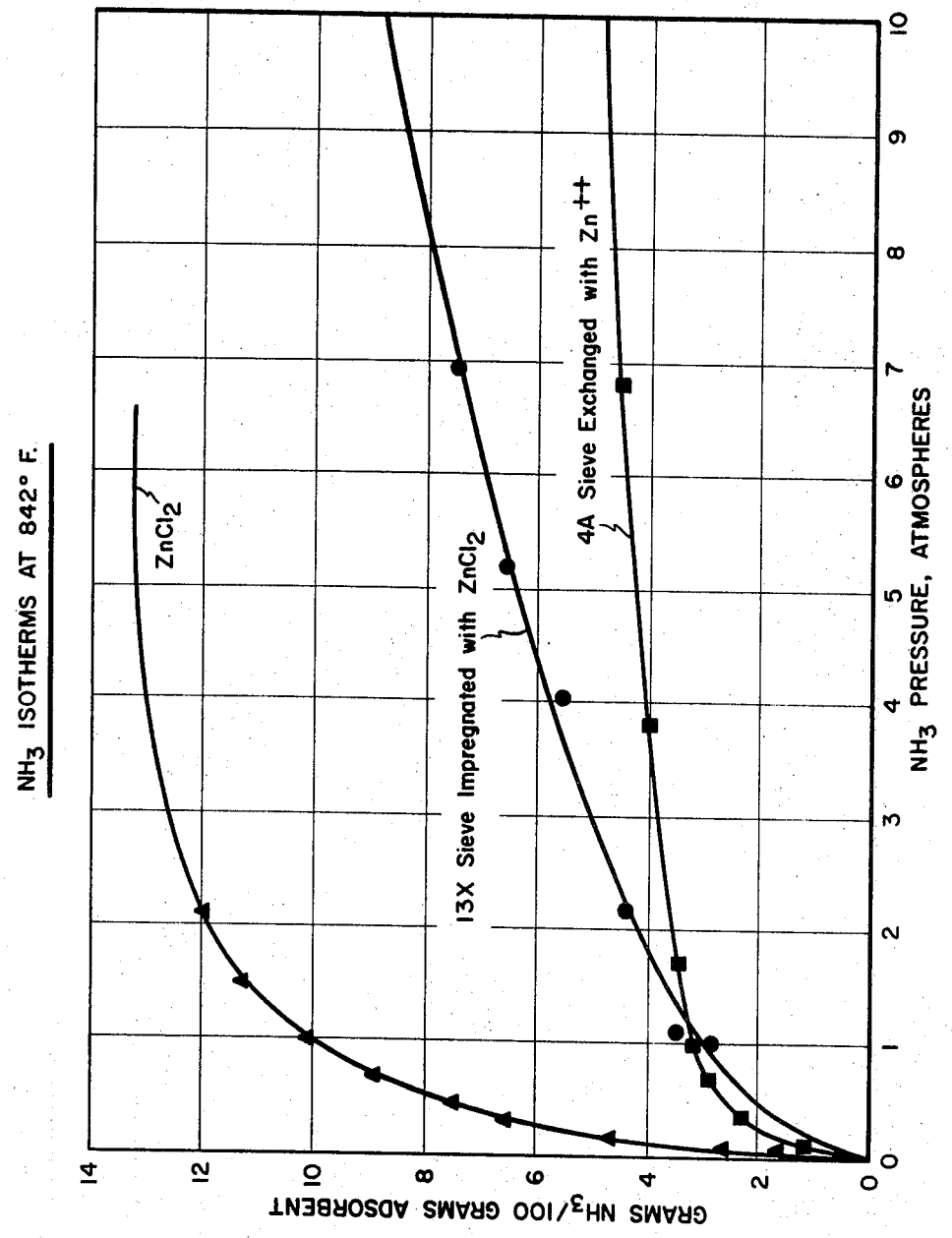

ABSTRACT OF THE DISCLOSURE

Improved selective sorbents for driving equilibria controlled reactions to completion are shown. A solid sorbent material is impregnated with a selective dissocable complexing agent, and the preferred solid sorbents are molecular sieves. The preferred complexing agents are metal halides such as zinc chloride and magnesium bromide, for improved ammonia synthesis, and olefin complexing salts such as copper chloride are employed for improved olefin separations.

---

The present invention concerns novel sorbent compositions having improved sorption capacity for selected components, methods for the preparation of said improved sorbents, and methods of using them. Even more particularly, this invention relates to novel sorbents and the methods of preparing such sorbents which can be used in novel processes to synthesize ammonia. A particular preferred embodiment of the present invention concerns modified crystalline zeolites, known as molecular sieves, having improved sorption properties, which are prepared from the impregnation of a zeolite sieve with a material having an affinity for the substance being adsorbed. Specifically, the preferred embodiment of the invention involves molecular sieves impregnated with metal halides, which metal halides are selected on the basis of their ability to form complexes with ammonia. The meal halide impregnated molecular sieves are especially useful in shifting the reaction equilibrium in ammonia synthesis from nitrogen and hydrogen to favor the formation of product ammonia.

There are many examples known to the chemical art of reversible gas phase equilibrium reactions in which the total number of molecules change. Such reactions are known either as combination or dissociation reactions depending upon the direction studied. Examples of such reactions include the dissociation of nitrogen tetroxide, the combination of sulfur and oxygen to form sulfur trioxide, the combination of nitrogen and hydrogen to form ammonia, the dissociation of a molecule of halide to form the atomic species, the dissociation of phosphorous pentachloride to form phosphorus trichloride and chlorine, and the dissociation of ammonium chloride to form ammonia and hydrochloric acid, among many others.

In such reactions, when the numbers of molecules of reactants and products are different, the position of equilibrium is affected by the total pressure although theoretically the value of $K_t$ should of course remain constant. It follows from the Le Chatelier principle that increase of pressure will tend to force the equilibrium in the direction in which there is a decrease in the number of molecules and the same conclusion is reached from the law of chemical equilibrium. An example of such a system is the exothermic formation of ammonia from nitrogen and hydrogen, that is $N_2 + 3H_2 \rightleftharpoons 2NH_3$. In this example, the fraction of nitrogen converted into ammonia increases with the total pressure being proportional to pressure at low conversions. Increase of the total pressure will tend to move the position of equilibrium in the direction of a decrease in the number of molecules, that is, it should favor the formation of ammonia. Furthermore, increase of temperature will result in a decrease in the yield of ammonia, as is to be anticipated since the reaction is exothermic.

In order to produce the maximum conversion to product in this type of reaction, e.g., nitrogen and hydrogen into ammonia, it is desirable to work at as low a temperature as is compatible with an appreciable rate of reaction. Therefore, catalysts are employed in order to expedite the process. Such catalytic systems are utilized in commercial processes, for example, the "American System" and the Haber process; however, in these processes the conversion is relatively low, generally ranging below 40% and as low as 8%. Therefore, any improvement in the technique which increases the conversion will, of course, result in great material benefits. One possible method for improving the conversion in a reversible gas phase equilibrium process involves the use of a sorbent which is selective to the product, either alone or in combination with or as part of the integral composition of a catalyst. The sorbent acts by removing the product from participation in the equilibrium reaction, i.e., by lowering the product partial pressure. This drives the equilibrium reaction in the direction of forming more product. However, once the adsorbent bed becomes saturated with product, stable equilibrium conditions will be established once more.

In order to make the reaction commercially feasible, it is necessary to remove the product from a reaction zone once saturation has been reached. This is most easily accomplished by utilizing a pressure cycle operation during the course of the reaction. Or a pressure cycle with product purge could alternately be used. One such pressure cycle with product purge technique is described in U.S. Pat. 2,944,627, issued July 12, 1960, entitled, "Method and Apparatus for Fractionating Gaseous Mixtures by Adsorption," issued to Charles W. Skarstrom.

In a pressure cycle operation, the product will be sorbed almost as soon as it is formed. That is, the product will be sorbed under reaction conditions of high pressure and temperature. The product then can be recovered from the bed by depressuring alone or with product purge or, in the alternative, by increasing the temperature, or by a combination of the aforementioned methods.

The properties of a sorbent chosen for use in a pressure cycle operation may therefore differ from the properties desired of an adsorbent under isobaric (temperature change) conditions, the object being to obtain the maximum working capacity in each case. For example, under isobaric conditions, the most important property of the adsorbent will be the slope of the adsorption isobar of the desired component over the range of operating temperature. On the other hand, the most important property for an adsorbent operating under pressure cycle conditions will be the slope of the isotherm over the desired pressure range.

The working capacity is defined as the total amount of product adsorbed at the adsorption conditions minus the total amount of material sorbed at desorption conditions. It is evident that this working capacity is approximately equivalent to the total amount of product withdrawn from the equilibrium reaction during each pressure cycle. Thus, it is of great importance to secure sorbents having a maximum working capacity value under the reaction and depressure conditions.

It is therefore an object of the present invention to provide sorbent compositions and methods for their preparation, which sorbents are characterized by the property of having high working capacities in pressure cycle equilibrium processes.

It is another object of the present invention to provide sorbent compositions which are solid and noncorrosive at relatively high reaction temperatures, e.g., up to 1000° F.

It is a still further object of this invention to provide sorbent compositions having relatively low vapor pressures and relatively high surface areas. Further objects will become readily apparent from the following discussion.

It has now been found and it forms one of the specific embodiments of this invention, that solid sorbent compositions of improved working capacity for $NH_3$ at reaction temperatures can be obtained by impregnating a solid sorbent material, e.g., a molecular sieve, with a metal halide capable of forming a complex with $NH_3$. Such metal halide is normally liquid at the usual temperatures and pressures for $NH_3$ synthesis. The use of an impregnated sieve has the following advantages over use of either the complexing agent, usually in the form of a molten salt, or the solid sorbent alone:

(1) The impregnated sieve is a solid with concomitant handling advantages even at elevated reaction temperatures, e.g., up to 1000° F. or higher.

(2) The impregnated sieve has a vapor pressure which is much lower than the corresponding vapor pressure of the molten complexing agent alone. This reduces the problem of loss of complexing agent and catalyst deactivation due to volatilization of the complexing agent.

(3) The impregnated sieve has an extremely high surface area which eliminates any problems as to sufficient contacting for mass transfer.

(4) The impregnated sieve has a higher working capacity than either the sieve alone or the complexing agent alone.

The crystalline zeolite molecular sieves used in a preferred embodiment of the present invention are defined as materials having crystalline structures containing a large number of small cavities interconnected by a number of still smaller holes or pores, the latter being of exceptionally uniform size. This class of materials includes certain zeolites which may be of natural or synthetic origin. The molecular sieve pores may vary in diameter from about 3 to 5 angstrom units to 10 to 15 or more. For a particular molecular sieve material, however, the pore sizes are substantially uniform and accordingly the material normally will be designated by the characteristic size of its pores.

The scientific and patent literature contains numerous refernces to the adsorbing action of natural and synthetic zeolites. Among the natural zeolites having this sieve property may be mentioned chabazites and analcite. A synthetic zeolite with molecular sieve properties is described in U.S. Pat. 2,442,191. Zeolites vary somewhat in composition, but generally contain silica, aluminum, and an alkali and/or alkaline earth element, e.g., sodium and/or calcium, magnesium, etc. Analcite has the empirical formula $NaAlSi_2O_6 \cdot H_2O$. Barrer (U.S. Pat. 2,306,610) teaches that all or part of the sodium is replaceable by calcium to yield, on dehydration, a molecular sieve having the formula $(CaNa_2)Al_2Si_4O_{12} \cdot 2H_2O$. Black (U.S. Pat. 2,522,426) describes a synthetic molecular sieve having the formula $4CaO \cdot Al_2O_3 \cdot 4SiO_2$.

In a preferred embodiment of the present invention involving the feature of synthesis of ammonia from nitrogen and hydrogen over a promoted iron catalyst, it is preferred that the molecular sieve utilized be one which has a pore size in the range of 4 A. to 13 A., and more preferably, in the range of 10 A. to 13 A. A most preferred embodiment comprises a molecular sieve having a pore size of 13 A. Commonly available molecular sieves of the type A and X variety can be satisfactorily used. The preferred composition of this molecular sieve is

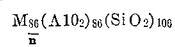

The preparation of molecular sieves having the desired properties is well known in the art as shown by the many patents cited above.

The complexing agent utilized in the present invention is selected for its property of having an affinity for the substance being adsorbed. For example, in the specific embodiment concerning the synthesis of ammonia, it is desirable to utilize metal halides as the impregnating agent since such metal halides exhibit the property of forming complexes with ammonia.

Preferred examples of metal halides useable in this embodiment of the present invention include the halides of metals in Groups II-A, II-B, VII-A and VIII of the Periodic Table.

Examples of specific preferred metal halides within these groups include the halides of zinc, manganese, iron, cobalt, nickel, and magnesium. Specific examples of compounds useable as complexing agents in the practice of the present invention include zinc chloride, zinc bromide, zinc iodide, manganese chloride, ferrous chloride, ferrous iodide, ferrous bromide, cobalt chloride, cobalt bromide, nickel chloride, magnesium chloride, magnesium bromide and magnesium iodide. Especially preferred compounds include the halides of zinc and magnesium. The most preferable compounds include zinc chloride and magnesium bromide.

In general, the impregnated solid sorbents, e.g., molecular sieves, of the invention are prepared by soaking the desired molecular sieves in a solution of the metal halide in water. The resulting impregnated sieve is then drained of the excess water and dried in an oven. Finally, the impregnated sieve is activated by heating under vacuum at elevated temperatures. It is desired that the sorbent be impregnated with a solution containing 0.4 to 1.5 grams of metal halide per gram of sorbent. Thus, for impregnating 40 grams of molecular sieves it is desired that a solution of 20 to 70 grams, preferably 35 to 55 grams, of the metal halide in 10 to 40 grams of water be utilized. The desired concentration of impregnated complexing agent on the molecular sieve is in the range of 20 to 200 weight percent, preferably 50 to 150 weight percent, based on the molecular sieve. The preparation of impregnated molecular sieves will be made more readily apparent by reference to the following specific example.

EXAMPLE 1

A total of 40 grams of a Linde 13 × molecular sieve, in the form of $\frac{1}{16}$ of an inch extruded pieces, was soaked for 15 minutes in a solution of 50 grams of zinc chloride ($ZnCl_2$) in 25 grams of water. The 13 × molecular sieve is a synthetic crystalline sodium aluminosilicate having a silica to aluminum molar ratio of 2.5±0.5 and further having a substantially uniform pore size of 13 angstroms. The soaking time is very important since it has been found that soaking the 13 × molecular sieve for more than 20 minutes causes disintegration of the sieve with a loss of its pellet form. Therefore, the soaking has to be carried out for a time less than disintegration time. This can easily be determined for any individual sieve.

After the sieve had been soaked, it was drained and dried for 24 hours in an oven at 150 to 200° F. It should be emphasized that the sieve is not washed after soaking since surface sorption of the metal halide is desired. The sieve was then activated by heating under vacuum at 200°, 400°, 600°, 800° and 1000° F. Heating at each temperature level was continued until the water vapor pressure was less than about 5 mm. The resulting impregnated sieve contained 113 weight percent of zinc chloride compared to the total amount of molecular sieve. Additionally, analysis of the sieve showed that the original percent of sodium was retained (6.6%).

An adsorption isotherm of this impregnated molecular sieve for ammonia was measured at 842° F. The resulting curve is shown in the figure. The results for the impregnated sieve have been compared with the curve derived from the adsorption isotherm for a 4A $Zn^{++}$ ion-exchanged sieve, which sieve has one of the best isotherms measured for an unimpregnated sieve. The difference between an impregnated sieve and an exchanged sieve is as follows:

An ion-exchanged sieve contains all its metal cations in stoichiometric amounts as part of the molecular framework of the sieve. The impregnated sieve has additional amounts of the metal salt, e.g. $ZnCl_2$, deposited in nonstoichiometric amounts on the surface and pores of the sieve.

Additionally, a curve representing the adsorption isotherm of molten zinc chloride has been included in the figure. In the relevant ammonia pressure range of 1–10 atmospheres, which would be the pressure range found under reaction conditions for the synthesis of ammonia from hydrogen and ammonia, the zinc chloride impregnated molecular sieve shows the highest working capacity.

In this range the 4A molecular sieve exchanged with zinc ion exhibits a working capacity of about 0.6 gram ammonia/100 grams sorbent. Similarly, molten zinc chloride exhibits a working capacity of about 2 grams ammonia/100 grams sorbent. In comparison to these figures, the zinc chloride impregnated sieve exhibits a capacity of about 6 grams ammonia/100 grams sorbent. The working capacity of the zinc chloride impregnated sieve therefore exhibits a greater working capacity than either a molecular sieve with the highest obtainable capacity or molten zinc chloride. Additionally and unexpectedly, the impregnated molecular sieve per 100 grams shows a higher working capacity than the sum of the results from the best molecular sieve and the molten zinc chloride runs based on 200 grams of adsorbent.

In its broadest aspect, the present invention concerns improved forms of solid sorbents having significantly increased working capacities due to the impregnation of the sorbent with a material having an affinity for the particular substance to be adsorbed. Examples of sorbents useable in the practice of the present invention in its broadest aspect include molecular sieves, materials used for catalyst supports, alumina, silica gel, charcoal, glass wool, absorbent cotton, soft tissue paper, metal oxides, clays, fuller's earth, bone char, etc. The choice of the particular sorbent to be used will of course depend upon the operation contemplated.

The choice of the impregnating agent will, of course, depend upon the nature of the substance being sorbed. It is preferable that the impregnating agent be one that will complex with the substance being sorbed. This complex should have the property of being easily dissociated by changing either the temperature or pressure of the system so that the sorbed substance may be recovered easily. The ammonia-metal halide-molecular sieve system provides an excellent example of such a complex.

Another example of a desirable system includes the impregnation of an olefin complexing salt on a molecular sieve, which system is useful in various butadiene and olefin recovery processes. A preferred embodiment of such a system for olefin separation involves the impregnation of copper chloride onto a molecular sieve. The advantages of the latter system over the use of copper chloride crystals as are now presently being employed include: the elimination of the agglomeration of complexed copper chloride crystals, improved contacting with the vapor feed streams, improved operating conditions, and improved recovery due to a favorable change in the shape of the adsorption isotherm.

Additional examples include sorbents impregnated with silver salts, e.g., $AGNO_3$, AgCl, AgBr, etc., for the complexing of organic aromatic compounds; with organic amino alcohols such as ethanolamine or 1-amino-2-propanol for the complexing of $CO_2$; with zinc oxide for the complexing of $CO_2$; and with organocobalt complex compounds such as bis-salicolaldehyde-ethylenediamine cobalt for the complexing of oxygen.

It will be appreciated that numerous variations and modifications of the foregoing inventive concept may be employed without departing from the spirit or scope of the invention. Such variations will be readily apparent to those persons skilled in the art and are included herein by reference.

What is claimed is:
1. An improved sorbent for ammonia comprising a 13 X molecular sieve impregnated with a sorption capacity improving amount of zinc halide.
2. The improved sorbent of claim 1 wherein said 13 X molecular sieve is impregnated with 20 to 200 weight percent of zinc chloride.
3. An improved process for the manufacture of ammonia comprising:
   (A) contacting nitrogen and hydrogen gas in a reaction zone with an ammonia synthesis catalyst at ammonia synthesis conditions of temperature and pressure whereby ammonia product is formed,
   (B) contacting said product ammonia in said reaction zone with a selective solid sorbent base impregnated with a sorption capacity improving amount of an agent which agent forms a dissociable complex with ammonia, whereby said product ammonia is effectively removed from participation in said equilibrium reaction thereby driving said reaction in the direction of forming more of said product ammonia.
4. The process of claim 3 wherein a pressure cycle technique is utilized so that said ammonia product is sorbed onto said impregnated solid sorbent at reaction conditions of pressure and temperature, and said ammonia product is recovered from said impregnated sorbent at a pressure in the pressure cycle below that of the reaction pressure.
5. The process of claim 4 wherein said selective solid sorbent comprises a molecular sieve and said impregnated complexing agent comprises a metal halide selected from the group of metal halides which form a dissociable complex with ammonia.
6. The process of claim 5 wherein said metal halide is selected from the group consisting of the halides of zinc, cobalt, iron, nickel, manganese and magnesium.
7. The process of claim 6 wherein said molecular sieve is a 13 X sieve and said metal halide is zinc chloride present in the concentration range of 20 to 200 weight percent based on the molecular sieve.

References Cited

UNITED STATES PATENTS

| 1,319,663 | 10/1919 | Davis et al. | 23—196 |
| 1,787,875 | 1/1931 | Perrott et al. | 55—70 |
| 3,193,987 | 7/1965 | Manes et al. | 55—74 |
| 3,287,086 | 11/1966 | Cahn | 23—198 |
| 2,944,627 | 7/1960 | Skarstrom | 55—62 XR |
| 3,034,947 | 5/1962 | Condisk et al. | 55—74 |

FOREIGN PATENTS

| 481,429 | 3/1938 | Great Britain. |

OSCAR R. VERTIZ, Primary Examiner

H. S. MILLER, Assistant Examiner

U.S. Cl. X.R.

55—389; 252—455, 441